United States Patent
Johnson

(10) Patent No.: US 9,816,709 B2
(45) Date of Patent: Nov. 14, 2017

(54) RETAINING PANEL FOR RADIANT THERMAL TRANSFER AND METHOD

(71) Applicant: GRAY METAL PRODUCTS, INC., Avon, NY (US)

(72) Inventor: Alan Johnson, Rush, NY (US)

(73) Assignee: Gray Metal Products, Inc., Avon, NY (US)

( * ) Notice: Subject to any disclaimer, the term of this patent is extended or adjusted under 35 U.S.C. 154(b) by 559 days.

(21) Appl. No.: 13/778,867

(22) Filed: Feb. 27, 2013

(65) Prior Publication Data

US 2014/0238638 A1    Aug. 28, 2014

(51) Int. Cl.
| F24D 3/12 | (2006.01) |
| F24F 5/00 | (2006.01) |
| F24D 3/14 | (2006.01) |
| B21D 53/08 | (2006.01) |

(52) U.S. Cl.
CPC .............. *F24D 3/122* (2013.01); *F24D 3/14* (2013.01); *F24F 5/0089* (2013.01); *B21D 53/08* (2013.01); *F24D 2220/2081* (2013.01); *Y10T 29/49364* (2015.01)

(58) Field of Classification Search
CPC .. F24D 3/12; F24D 3/122; F24D 3/14–3/144; F24D 3/16; F24F 5/0089; F24F 5/0092; Y10T 2/49364; Y10T 29/493649; F24J 2/265
USPC .................................................. 165/171, 49
See application file for complete search history.

(56) References Cited

U.S. PATENT DOCUMENTS

| 2,736,406 | A | * | 2/1956 | Johnson ........................ 52/761 |
| 3,444,596 | A | * | 5/1969 | Soltysik ........................ 248/73 |
| 4,241,727 | A | * | 12/1980 | Toti ........................ F24J 2/265 |
| | | | | 126/659 |
| 4,766,951 | A | | 8/1988 | Bergh |
| 5,108,055 | A | * | 4/1992 | Kreinberg et al. ............. 248/71 |
| 5,131,458 | A | | 7/1992 | Bourne et al. |
| 5,454,428 | A | | 10/1995 | Pickard et al. |
| 5,598,682 | A | | 2/1997 | Haughian |
| 5,743,330 | A | | 4/1998 | Bilotta et al. |
| 5,788,152 | A | | 8/1998 | Alsberg |
| 5,862,854 | A | | 1/1999 | Gary |
| 6,152,377 | A | | 11/2000 | Fiedrich |
| 6,182,903 | B1 | | 2/2001 | Fiedrich |
| 6,417,758 | B1 | * | 7/2002 | Russell et al. ................ 337/380 |
| 6,910,526 | B1 | | 6/2005 | Sokolean |
| 7,832,159 | B1 | | 11/2010 | Kayhart |
| 8,025,240 | B2 | | 9/2011 | Keller |
| 8,256,690 | B2 | | 9/2012 | Newberry |
| 2003/0173057 | A1 | | 9/2003 | Yan et al. |
| 2007/0222209 | A1 | | 9/2007 | Rise et al. |

* cited by examiner

*Primary Examiner* — Grant Moubry
*Assistant Examiner* — Harry Arant
(74) *Attorney, Agent, or Firm* — Andrew J. Anderson, Esq.; Harter, Secrest & Emery LLP

(57) ABSTRACT

A panel, for retaining a heating or cooling tube relative to a substrate, has a standoff extending from a primary flap, wherein the standoff includes a tube contacting surface. A lateral fold extends from the standoff and includes a jaw having a tube retaining surface, wherein the tube contacting surface and the tube retaining surface are located to define a tube retaining channel in a closed position of the jaw. The panel can be formed of a single piece of sheet metal, wherein the sheet metal and configuration of the panel bias the jaw to the closed position.

3 Claims, 2 Drawing Sheets

RETAINING PANEL FOR RADIANT THERMAL TRANSFER AND METHOD

CROSS-REFERENCE TO RELATED APPLICATIONS

Figure 1:
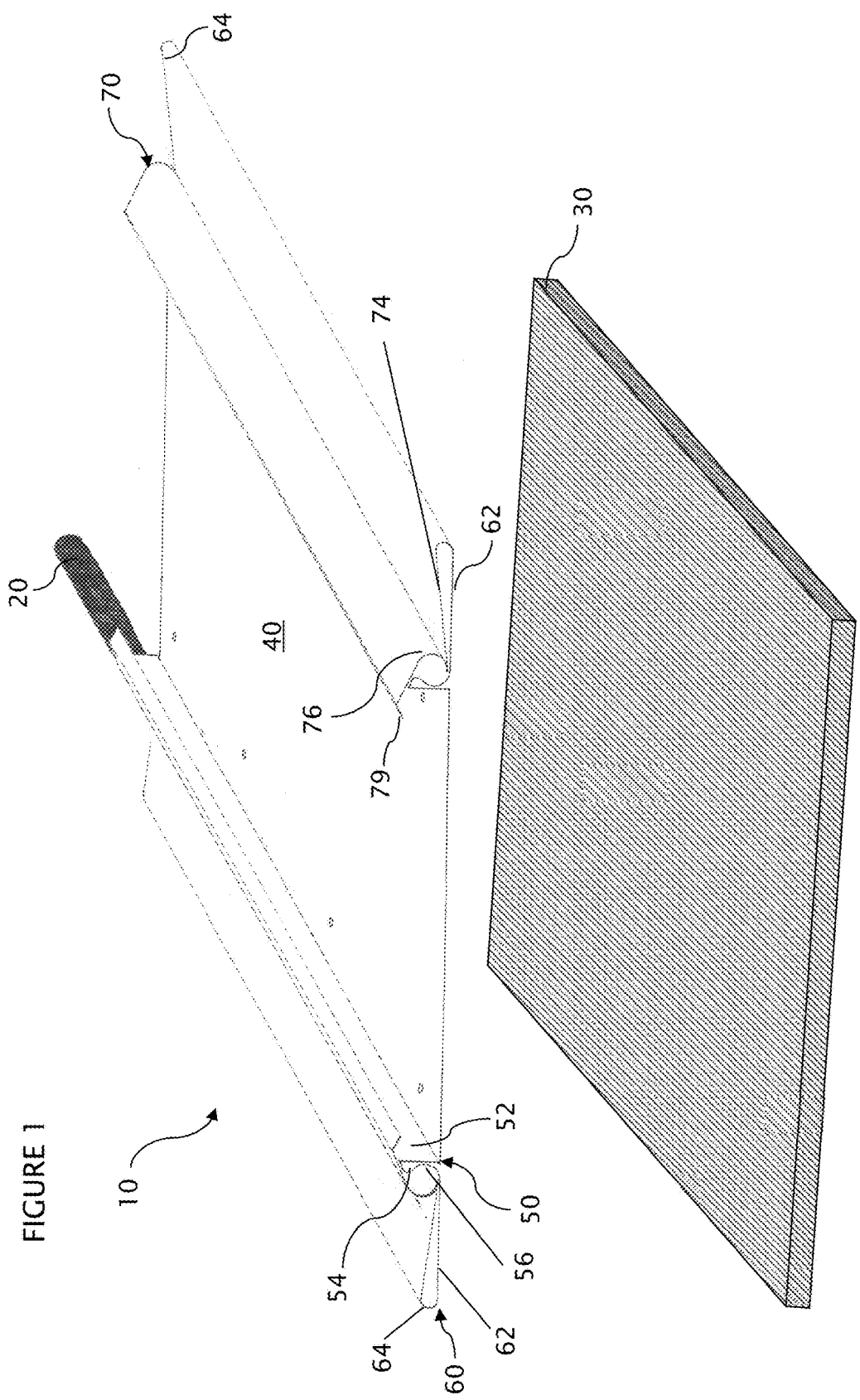

None.

STATEMENT REGARDING FEDERALLY SPONSORED RESEARCH OR DEVELOPMENT

None.

REFERENCE TO A "SEQUENCE LISTING"

Not applicable.

BACKGROUND OF THE INVENTION

Field of the Invention

The present invention relates to a panel for retaining a heating or cooling tube relative to a substrate to be thermally conditioned and more particularly to a retaining panel having flaps for enhancing thermal transfer and a moveable jaw for releasably retaining a length of tubing relative to the substrate, and more particularly to a retaining panel wherein the flaps and the jaw are integrally formed from a single piece of sheet metal.

Description of the Related Art

Hydronic heating systems are well-known. In a floor heating system, an entire floor surface is used to transmit the energy necessary to heat a room by circulating warm water (or an appropriate heat transfer fluid) through plastic tubing within a floor structure that lies just below the surface. Such a floor heating system distributes heat through the floor without above floor radiators, duct grilles or returns. In some installations, structures, a subflooring structure is employed, wherein the subflooring structure incorporates grooves to retain the plastic tubing. Heating fluid, such as warm water, passes through the tubing, heating the subflooring system and the floor above, where it radiates into the space to be heated.

The tubing is a synthetic material, such as polyethylene or polybutylene, PEX, BPEX and PEX-AL-PEX tubing herein called "plastic" tubing. However, the tubing must be located relative to the substrate to the heated. Typical installations require the installer to layer out the tubing then fasten the tubing without damaging the tubing.

Therefore, the need exists for a panel that can retain the tube relative to (i) the substrate to be thermally conditioned and (ii) a remaining length of tube, while reducing installation errors and time. Further, the need exists for panel that can provide efficient thermal transfer between the tube and the substrate.

BRIEF SUMMARY OF THE INVENTION

Briefly, the present disclosure relates to a radiant thermal transfer panel for releasably retaining a tube, the panel having a primary flap, a standoff having a first leg extending from the primary flap and a second leg defining a tube contacting surface; and a lateral fold extending from the second leg, the lateral fold including a lateral flap connected to the second leg and a jaw connected to the lateral flap, the jaw extending toward the standoff and having a tube retaining surface, the tube retaining surface and the tube contacting surface forming a tube retaining channel.

In one configuration, the jaw includes a lever section, and the lever section is sized to overlay a portion the standoff. The jaw can be biased to a closed position. The bias of the jaw can be provided by a resilient bend which connects the lateral flap and the jaw.

It is further contemplated the primary flap, the standoff and the lateral fold are integral, and can be formed of a single piece of sheet metal.

In another configuration, the radiant thermal transfer panel can include a second standoff having a third leg extending from the primary flap and a fourth leg defining a second tube contacting surface; and a second lateral fold extending from the fourth leg, the second lateral fold including a second lateral flap connected to the fourth leg and a second jaw connected to the second lateral flap, the second jaw extending toward the second standoff and having a second tube retaining surface, the second tube retaining surface and the second tube contacting surface forming a second tube retaining channel.

The present disclosure further provides a method of locating a length of tube relative to a substrate to be heated, by affixing a retaining panel relative to a substrate, the retaining panel having (i) a primary flap, (ii) a standoff having a first leg extending from the primary flap and a second leg defining a tube contacting surface; and (iii) a lateral fold extending from the second leg, the lateral fold including a lateral flap connected to the second leg and a jaw connected to the lateral flap, the jaw extending toward the standoff and having a tube retaining surface to form a retaining channel with the tube contacting surface; and moving the jaw from a closed position to an open position; and disposing a length of tube within the retaining channel.

BRIEF DESCRIPTION OF THE SEVERAL VIEWS OF THE DRAWING(S)

Figure 2:
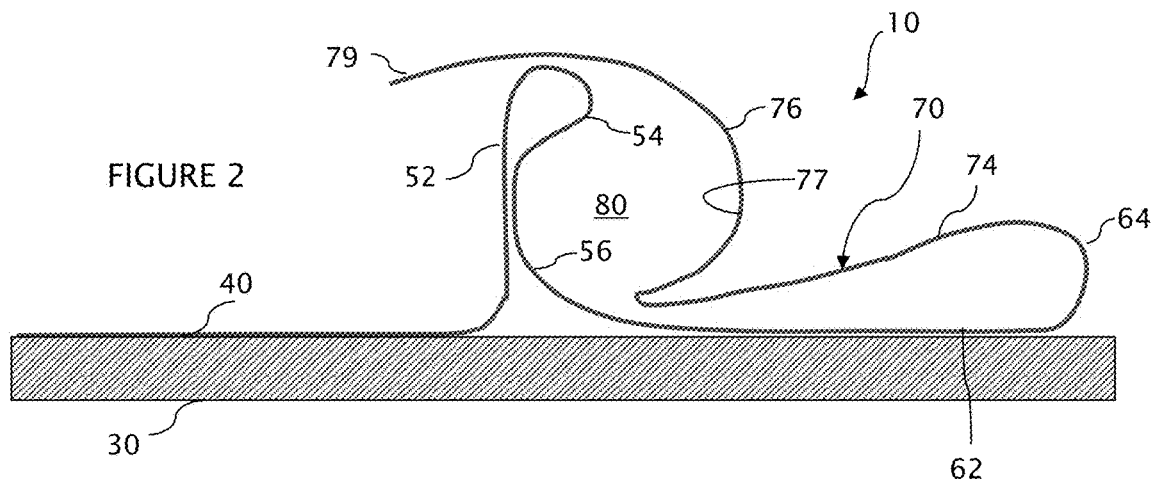
Figure 3:
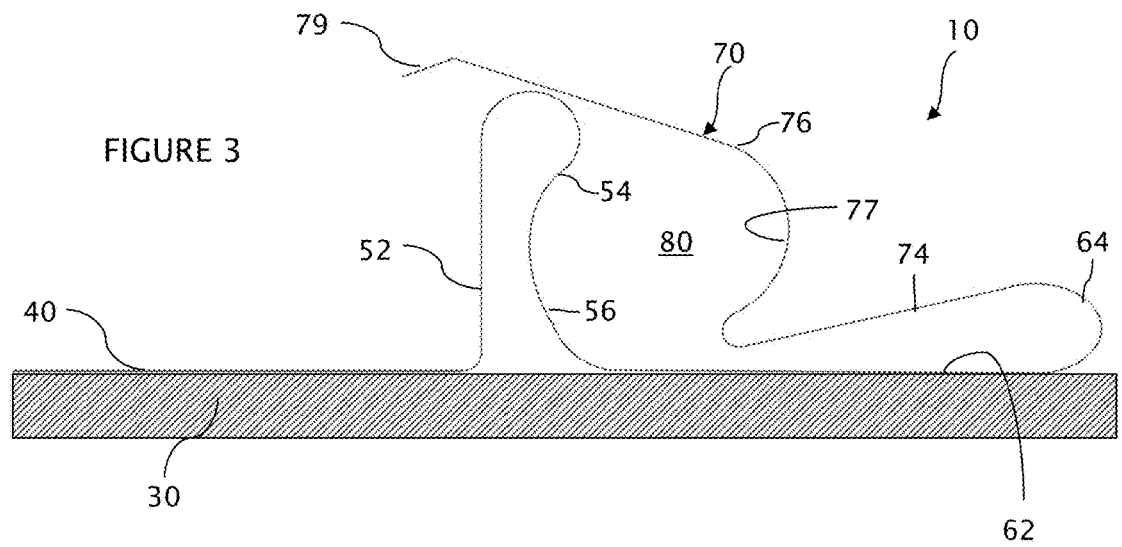

FIG. 1 is a perspective view of a panel.
FIG. 2 is a cross sectional view of a portion of a panel.
FIG. 3 is a cross sectional view of a portion of an alternative panel configuration.

DETAILED DESCRIPTION OF THE INVENTION

Generally, the system includes a radiant thermal transfer panel 10 for releasably retaining a tube 20 relative to a substrate 30.

The substrate 30 can be any of a variety of constructions such as floors, ceilings or walls. The floors, ceilings or walls can be of modular construction or traditional stick construction, wherein the tube is to be located proximate to a surface of the wall, floor or ceiling such that thermal transfer occurs between the tube and the wall, floor or ceiling. It is also contemplated the substrate can be a poured material such as concrete or plaster.

The tube 20 can be any of a variety of materials. The tube 20 conducts a chilled or heated (conditioned) fluid, wherein the thermal transfer between the fluid and the substrate 30 is achieved by thermally exposing the conditioned fluid to the substrate. Advantageously, the tube 20 is sufficiently flexible to permitting ready fitting to an intended installation area. Typical radii of curvature for the tube range from approximately 2-8 inches to approximately 2-4 feet. The tube 20 is usually relatively efficient in thermal transfer with the panel. The tube 20 can have any of a variety of diameters. Typical tube diameters range from approximately a quarter inch to approximately two inches.

The tube 20 can be formed of any of a variety of materials including polyethylene, cross linked polyethylene (PEX, PEX-A, PEX-B or PEX-C), composites including layers of cross linked polyethylene and metal or an alloy such as aluminum (PEX-AL-PEX). The tube 20 can also be a metal, wherein the metal is selected and sized to permit the necessary curvature for installation relative to the substrate.

While the tube 20 is described in terms of passing a thermally conditioned fluid, it is contemplated the tube can carry an electrical element, thereby providing resistive heating which is to be thermally transferred to the substrate. Thus, the tube 20 can include conduit for transferring liquid as well as electrical conductors for resistive heating.

To promote the thermal transfer between the tube 20 and the substrate 30, the panel 10 thermally couples the tube to the substrate. That is, the panel 10 has an efficient thermal transfer with the tube 20, and an increased surface area exposed to or contacting the substrate 30 which provides efficient thermal transfer to the substrate.

The panel 10 includes a primary flap 40, a standoff 50 and a lateral fold 60, wherein the standoff and the lateral fold define a tube retaining channel 80 for retaining a length of tube 20.

In one configuration, the primary flap 40 is substantially planar. It is contemplated the primary flap 40 may include a textured or featured surface, wherein the flap is generally flat. That is, the primary flap 40 may include a multiplicity of pyramid, concavities or even grooves which have a dimension sufficiently smaller than the panel 10, that the primary flap remains substantially planar. It is contemplated the primary flap 40 can include longitudinally extending breaks, pleats or folds for increasing rigidity without materially reducing thermal transfer. Depending on the desired thermal contact with the substrate 30 and the increased rigidity from local folds or pleats, the primary flap 40 can include variations from geometrically planar, and yet still be functionally planar.

Thus, the term planar encompasses variations on the order of the thickness of the material forming the flap, as well as a majority of the flap being planar, wherein a minority of the area of the flap may include the texturing or surface features. It is also recognized that depending on the size of the texturing or surface features, that the entire area of the primary flap 40 may be textured or include surface features, yet remain planar for purposes of the present description.

The standoff 50 includes a first leg 52 extending from the primary flap 40 and a second leg 54 defining a tube contacting surface 56. The height of the standoff 50, the maximum perpendicular distance from the primary flap 40 to the top of the standoff, is determined by the anticipated size, diameter, of the tube 20 to be retained. In one configuration, the standoff 50 is self-supporting for engagement with the tube 20 as well as providing increased rigidity of the panel 10.

The second leg 54 defines the tube contacting surface 56. The tube contacting surface 56 can include a concave or arcuate surface for receiving and seating a portion of a periphery of the tube 20. The specific curvature of the tube contacting surface 56 is generally dictated by the diameter of the intended tube 20.

The second leg 54 connects to the lateral fold 60. The lateral fold 60 includes a lateral flap 62, typically substantially coplanar with the primary flap 40, and a jaw 70 extending from the lateral flap.

Although not required, the lateral flap 62 can have a smaller dimension transverse to the standoff 50 than the primary flap 40. In one configuration, the lateral flap 62 is sized to permit the transition from the lateral flap to the jaw, by forming a radius (resilient bend) 64 in a piece of sheet metal forming the panel 10. Thus, a radius in the panel 10 links the lateral flap 62 to the jaw 70. It is understood the jaw 70 can be a separate component from the lateral flap 62 and subsequently joined to the lateral flap.

As seen in FIGS. 1-3, the jaw 70 includes a spacing section 74, a tube retaining section 76 and a lever section 78.

The spacing section 74 is connected to the lateral flap 62 through the transition or bend 64. The spacing section 74 is sized to generally locate the tube retaining section 76 relative to the standoff 52, and particularly the tube contacting surface 56, thereby partially setting the size of the tube retaining channel 80.

The spacing section 74 transitions to the tube retaining section 76 through a transition radius 75. The size of the transition radius 75 is partially determined by the material of the panel, the forming equipment and the size of the tube 20 to be received and retained.

The tube retaining section 76 includes a concave or arcuate, tube retaining surface 77 for contacting and seating a portion of the periphery of the tube 20. The specific curvature of the tube retaining surface 77 is generally dictated by the size of the tube 20 to be cooperatively engaged with the panel 10. The tube refraining channel 80 thus has a diameter defined by the tube contacting surface 56 and the tube retaining surface 77, wherein the diameter of the tube retaining channel is typically between approximately 50% to approximately 125% of the diameter of the tube 20.

The lever section 78 extends from the tube retaining section 76 and is sized for assisting in movement of the jaw 70 from the closed position to the open position. In closed position, the jaw 70 retains the tube 20 relative to the standoff 50 and in the open position, the jaw permits insertion or removal of the tube from between the jaw and the standoff. In one configuration, the lever section 78 overlies the standoff 50 and extends to overlay a portion of the primary flap 40. As the lever section 78 is generally spaced from the primary flap 40 by the height of the standoff 50, the operator can readily locate a finger between the primary flap and the lever section to then engage the lever section and move the jaw 70 from the closed position to the open position.

In one configuration, a free end of the lever section includes a lip 79 which can be bent towards the primary flap 40 or away from the primary flap.

The resilient bend 64 and the material of the panel 10 can be selected to bias the jaw 70 to the closed position so as to retain the tube 20 within the tube retaining channel 80 and hence the panel. The resiliency or bias urging the jaw 70 to the closed position is sufficient to overcome any weight of the tube 20 (loaded with fluid). That is, unintended opening of the jaw 70 in response to a weight of the operating tube 20 is preferably precluded by the bias of or on the jaw.

In one configuration, the radius in the material of the panel 10 at the bend 64 is sufficient to bias the jaw 70 to the closed position, while permitting movement of the jaw to an open position. In an alternative configuration, a bias member such as a spring can be connected to the jaw 70 and the standoff (or the lateral flap) to bias the jaw.

In one construction, the panel 10 is formed of a single piece of material, such as sheet metal, wherein each of the structural components is formed by bending (or forming) the single piece of sheet metal. Thus, the primary flap 40 transitions to the first leg 52 of the standoff 50 at a first radius (or effectively a fold), the top of the standoff is defined by a second radius, which is typically greater than the first radius. The second leg 54 of the standoff 50 includes the concave tube contacting surface 56 for generally matching the periphery of the tube 20. The second leg 54 then transitions to the lateral flap 62 at a third radius. The lateral flap 62 transitions to the spacing section 74 of the jaw 70 at a forth radius (the resilient bend 64). The spacing section 74 transitions to the tube retaining section 76 at a fifth radius. The tube retaining section 76 transitions to the lever section 78 at a generally constant curvature, a sixth transition or as an extension of the tube retaining section.

The term sheet metal is understood to encompass any metallic material in sheets or plates. Typically, the sheet metal is less than 0.2 inches in thickness. The thickness is alternatively often defined in the art as between a plate and a foil. The sheet metal is self-supporting, yet able to be formed such as by rolling or bending to a radius of less than 2 inches. The sheet metal can be galvanized or non-galvanized.

While sheet metal is employed in a number of configurations, it is understood that other materials or laminates can be used. Advantageously, the heat conducting properties of the alternative materials would be at least substantially similar to those of typical sheet metals.

In certain configurations, the panel 10 can include one or more standoffs 50, wherein the standoffs generally extend proximal to a longitudinal edge of the panel. Thus, the primary flap 40 is located intermediate the standoffs 50, and the lateral folds 60 define the edge of the panel 10.

While the standoffs 50 (and hence tube location) can be located anywhere within the panel 10, for efficient material use, it is advantageous to locate the standoffs 50 as close to the lateral edges of the panel 10 as possible. Thus, the amount of overlapping material (the lateral flap 62 and the spacing section 74) is minimized.

In a panel 10 having a pair of standoffs 50, representative dimensions of the panel include a 12 inch width with approximately 7⁷⁄₁₆ inches between the first leg 52 of the standoffs 50. The panel 10 has a dimension of eight inches between the centers of the tube retaining channels 80. The lateral flap 62 has a length of 1²⁹⁄₃₂ inches and the distance between the first leg 52 of the standoff 50 and the lateral flap 62 is ⅜ inch and the distance from the tube retaining section 76 of the jaw 70 to the lip 79 is ¹¹⁄₁₆ inch, with the lip being ¼ inch.

The primary flap 40 can include a plurality of spaced apertures for receiving fasteners for retaining the panel 10 relative to the substrate 30. In one configuration, the apertures are spaced approximately one inch from first leg of the nearest standoff.

In use, a desired length or run of the panel 10 is determined, wherein the standoff 50 extends along the length of the panel. The panel 10 is then cut to a desired length.

In the configuration of installing the panel 10 between floor joists, the panel is attached to the underside of the floor between the joists. The panel 10 is installed with the primary flap 40 against the underside of the floor and the standoffs 50 projecting away from the underside of the floor. The panel 10 can be attached to or relative to the substrate 30 by adhesives, mechanical fasteners such as screws or nails, as well as brackets and clips.

Generally, substantially the entire area to be subject to the conditioned fluid is at least partially covered with the panels 10. Depending on the thermal conductivity of the substrate 30, the panels 10 may overlay as much as 100% of the substrate area to as little as 10% of the substrate area.

The tube 20 is then engaged with the panel 10 by grasping the lever section 78 and moving the jaw 70 from the closed position to the open position by a sufficient distance to pass the diameter of the tube between the top of the standoff 50 and the jaw.

The tube 20 is then seated such that a portion of the circumference of the tube contacts the tube contacting surface 56 of the second leg 54. The jaw 70 is then allowed to return to the closed position, such that the tube retaining surface 77 of the jaw contacts a portion of the tube circumference and seats the tube 20 within the tube retaining channel 80.

In one configuration, the material of the panel 10 has sufficient resiliency so that the jaw 70 can be moved between the open and the closed position at a first longitudinal position of the panel while the jaw 70 remains in the closed position at a spaced apart second longitudinal position. For example, the material of the panel 10 can be formed such that the jaw 70 remains in the closed position at a distance of approximately 6 inches, and in some configurations 12 inches and in further configurations 24 inches from a location of the jaw being in the open position to pass the diameter of the tube 20.

Various embodiments have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

The invention claimed is:

1. A radiant thermal transfer panel for releasably retaining a tube, the panel comprising:
    (a) a primary flap;
    (b) a first radius connecting the primary flap to a first leg of a standoff, a top of the standoff defined by a second radius;
    (c) a second leg of the standoff extending from the second radius toward the primary flap, the second leg including a concave tube contacting surface;
    (d) a third radius connecting the second leg to a lateral flap;
    (e) a fourth radius connecting the lateral flap to a spacing section of a jaw;
    (f) a fifth radius connecting the spacing section to a tube retaining section, the tube retaining section and the tube contacting surface formed in a single piece of material and configured to releasably retain the tube; and
    (g) a lever section extending from the tube retaining section, the lever section extending to locate the standoff between the lever section and the primary flap;
    wherein elements (a)-(g) of the panel are formed by a single continuous piece of sheet metal, such that the single continuous piece of sheet metal forms a tube retaining channel between the tube contacting surface and the tube retaining surface of the panel.

2. The radiant thermal transfer panel of claim 1, wherein the second radius is greater than the first radius.

3. A radiant thermal transfer panel for releasably retaining a tube, the panel comprising:
    (a) a primary flap, the primary flap having a width and a length in a first plane and a thickness in a second plane, the second plane being perpendicular to the first plane and the width and the length being greater than the thickness;

(b) a first radius connecting the primary flap to a first leg of a standoff, a top of the standoff defined by a second radius;
(c) a second leg of the standoff extending from the second radius toward the primary flap, the second leg including a concave tube contacting surface;
(d) a third radius connecting the second leg to a lateral flap, the lateral flap extending along the length of the primary flap in the first plane and being substantially coplanar with the width of the primary flap in the first plane;
(e) a fourth radius connecting the lateral flap to a spacing section of a jaw;
(f) a fifth radius connecting the spacing section to a tube retaining section; and
(g) a lever section extending from the tube retaining section, the lever section extending to locate the standoff between the lever section and the primary flap;
wherein elements (a)-(g) of the panel are formed by a single continuous piece of sheet metal, such that the single continuous piece of sheet metal forms a tube retaining channel between the tube contacting surface and the tube retaining surface of the panel.

* * * * *